(12) United States Patent
Ding

(10) Patent No.: US 11,051,380 B2
(45) Date of Patent: Jun. 29, 2021

(54) DRIVER AND LIGHTING MODULE

(71) Applicant: LEDVANCE GmbH, Garching bei Munchen (DE)

(72) Inventor: ShiYu Ding, Guangdong (CN)

(73) Assignee: LEDVANCE GMBH, Garching bei Munchen (DE)

( * ) Notice: Subject to any disclaimer, the term of this patent is extended or adjusted under 35 U.S.C. 154(b) by 0 days.

(21) Appl. No.: 16/377,618

(22) Filed: Apr. 8, 2019

(65) Prior Publication Data

US 2019/0313492 A1  Oct. 10, 2019

(30) Foreign Application Priority Data

Apr. 8, 2018  (CN) .......................... 201810306080.1

(51) Int. Cl.
*H05B 45/10* (2020.01)
*H05B 45/37* (2020.01)

(52) U.S. Cl.
CPC ............. *H05B 45/37* (2020.01); *H05B 45/10* (2020.01)

(58) Field of Classification Search
CPC ........ H05B 45/37; H05B 45/10; H05B 41/32; H05B 33/0815; H05B 33/0851; H05B 45/18; H05B 45/38; H05B 45/385; H05B 45/3725; Y02B 20/30
USPC ......................................................... 315/186
See application file for complete search history.

(56) References Cited

U.S. PATENT DOCUMENTS

| | | | |
|---|---|---|---|
| 2006/0244398 A1* | 11/2006 | Kitamura | H01F 27/323 315/375 |
| 2011/0309759 A1* | 12/2011 | Shteynberg | H05B 33/0815 315/201 |
| 2018/0177009 A1* | 6/2018 | Zhang | H05B 33/0815 |
| 2019/0174596 A1* | 6/2019 | Wen | H05B 45/10 |

\* cited by examiner

*Primary Examiner* — Alexander H Taningco
*Assistant Examiner* — Amy X Yang
(74) *Attorney, Agent, or Firm* — Hayes Soloway PC

(57) ABSTRACT

A driver for a lighting module has driver inputs for receiving a supply voltage from an electronic control gear (ECG) and driver outputs for supplying power to the light-emitting element. The driver also has a ring choke converter (RCC) control circuit with a power switching transistor and with a transformer for supplying power to the driver outputs. The power switching transistor is adapted to control power supplied to the transformer. Coupled to the RCC control circuit, the driver furthermore has a feedback circuit. The feedback circuit is adapted to stabilize the power provided to the light-emitting element.

11 Claims, 2 Drawing Sheets

US 11,051,380 B2

DRIVER AND LIGHTING MODULE

CROSS-REFERENCE

This patent application claims the benefit of and priority to Chinese Patent Application No. 201810306080.1 filed on Apr. 8, 2018, the entire disclosure of which is incorporated herein by reference.

TECHNICAL FIELD

The invention relates to a driver for a lighting module and a lighting module comprising the driver.

TECHNICAL BACKGROUND

For years, fluorescent lamps have been commonly known and widespread lighting devices as efficient alternatives for incandescent light bulbs. However, with the advent of LED lamps, even more efficient and long-lived lighting means are available. Furthermore, in comparison to fluorescent lamps, materials of LED lamps are safer since, for example, no mercury is required. Therefore, there is a demand for replacing existing fluorescent lamps with LED lamps, preferably without having to change the entire luminaire or the lamp fixture.

Currently available fluorescent lamp fixtures often comprise an electronic ballast (also called electronic control gear, abbreviated ECG) for regulating and limiting the current that is provided to the fluorescent lamp. Thus, LED lamps (LED retrofit lamps) which are used to replace fluorescent or halogen lamps need to be compatible with the ECG.

Simply connecting the output of an ECG to a light-emitting element such as a LED can, however, damage or destroy the LED. Unlike fluorescent lamps, LED tubes do not require a high start-up voltage; indeed, subjecting the LED to the high start-up voltage generated by the ECG can damage or destroy the LED. Furthermore, ECG's produced by different manufacturers may output different currents, which should be taken into account because LED's operate best within a limited current range that is specific to the LED.

SUMMARY OF THE INVENTION

In view of the above disadvantages of currently available lighting modules, it is an object of the present invention to provide a driver for a LED lamp, for retrofitting an existing lighting module such as a currently available fluorescent lamp fixture comprising an ECG, so as to render it compatible with an LED lamp. The driver is designed to improve stability of the current which is delivered by the driver to the LED lamp.

This object is solved by a driver for a lighting module according to the independent claim. Preferred embodiments are given by the dependent claims, the description and the drawings.

Accordingly, a driver for a lighting module is provided, comprising driver inputs for receiving a supply voltage from an ECG and driver outputs for supplying power to a light-emitting element. The driver further comprises a ring choke converter (RCC) control circuit, which in turn comprises a power switching transistor and a transformer for supplying power to the driver outputs. The power switching transistor is adapted to control power supplied to the transformer. Finally, the driver also comprises a feedback circuit coupled to the RCC control circuit. The feedback circuit is adapted to stabilize the power provided to the light-emitting element.

The use of the feedback circuit enables installation of the driver into a lighting module with a conventional ECG, in that the feedback circuit can help to stabilize the power provided by the driver to the light-emitting element. Specifically, when an increase in current through the light-emitting element is sensed within the feedback circuit, the feedback circuit reacts by increasing the conduction time of the power switching transistor, thus decreasing the power delivered to the light-emitting element. Without the provision of a feedback circuit, an unforeseen increase in power provided to the light-emitting element could remain uncorrected, and ultimately damage the light-emitting element or even destroy it.

In a first aspect, a driver is proposed wherein the feedback circuit is further adapted to limit or counteract an increase in the power supplied by the power switching transistor to the transformer when the driver is operated at an increased operating temperature. In general, an increase in operating temperature of the driver means that certain transistors within the driver may switch on when a lower voltage is applied to the base of the transistor. In other words, an increase in driver temperature can lead to a decrease in the threshold voltage (alternatively referred to as switching voltage $V_{BE}$-ON) of certain transistors within the driver.

Therefore, the driver according to the first aspect is designed to help prevent instability (such as a large increase) in the power supplied by the driver to the light-emitting element such as an LED in case of a change in operating temperature. Without the provision of a feedback circuit, a temperature increase would lead to a decrease in the conduction time of the power switching transistor, and a corresponding increase in the power provided to the transformer. Because the feedback circuit is provided within the driver, these effects are counteracted.

According to a further aspect, a driver is proposed wherein the RCC control circuit further comprises a conduction limiting transistor coupled to the power switching transistor. The feedback circuit further comprises a feedback transistor coupled to a base of the conduction limiting transistor to cause the conduction limiting transistor to increase the conduction time of the power switching transistor when a current through the light-emitting element exceeds a threshold.

This feedback mechanism also has the advantage of counteracting shifts in operating temperature of the driver. In case the driver is operating at an increased temperature, a threshold voltage of the conduction limiting transistor is decreased. This leads directly to a decrease in the conduction time of the power switching transistor, and a corresponding increase in the power provided to the transformer. However, the threshold voltage of the feedback transistor also reacts to the increased operating temperature, and is thereby reduced. This causes an increase in the conduction time of the power switching transistor, and a corresponding decrease in the power provided to the transformer. The feedback transistor therefore counteracts the conduction limiting transistor, when both transistors are subjected to a change in operating temperature. In summary, the arrangement of the conduction limiting transistor and the feedback transistor reduces the influence of temperature on the driver's operation.

According to this aspect of the driver, the current delivered to the light-emitting element can be measured as a voltage over a feedback-control resistor. This voltage is applied to a base of the feedback transistor. This provides a simple and effective way to sense an amount of current delivered to the light-emitting element. According to this aspect, the feedback-control resistor can be provided within the feedback circuit.

According to another aspect of the driver, the conduction limiting transistor and/or the feedback transistor can be implemented as a bipolar junction transistor. In a preferable aspect, the transistors which are used to implement the conduction limiting transistor and the feedback transistor are chosen to have the same polarity. This ensures that any shifts in threshold voltage due to temperature will occur in the same direction for both transistors, thus allowing the effects of operating temperature of the driver to be counteracted and thereby limited.

According to another aspect of the driver, the power switching transistor may be implemented as a MOSFET.

According to a further aspect of the driver, the driver may further comprise a bridge for receiving the supply voltage from the driver inputs and supplying power to the RCC control circuit. This can help suppress high voltage provided at ignition by the ECG and help convert the supply voltage provided by the ECG to a more stable voltage, which in turn is more compatible with the input requirements of the LED.

It is another object of the present invention to provide a lighting module comprising a driver and a light-emitting element, wherein the light-emitting element is coupled to driver outputs of the driver. The driver preferably is the driver as described above. That is to say, all features that are disclosed in connection with the driver are also disclosed in connection with the lighting module, and vice versa.

The light-emitting element preferably comprises a light-emitting diode (LED) or is a light-emitting diode. The lighting module may be adapted for being placed into an LED lamp.

BRIEF DESCRIPTION OF THE DRAWINGS

The present disclosure will be more readily appreciated by reference to the following detailed description when being considered in connection with the accompanying drawings, in which.

DETAILED DESCRIPTION OF THE INVENTION

Figure 1:
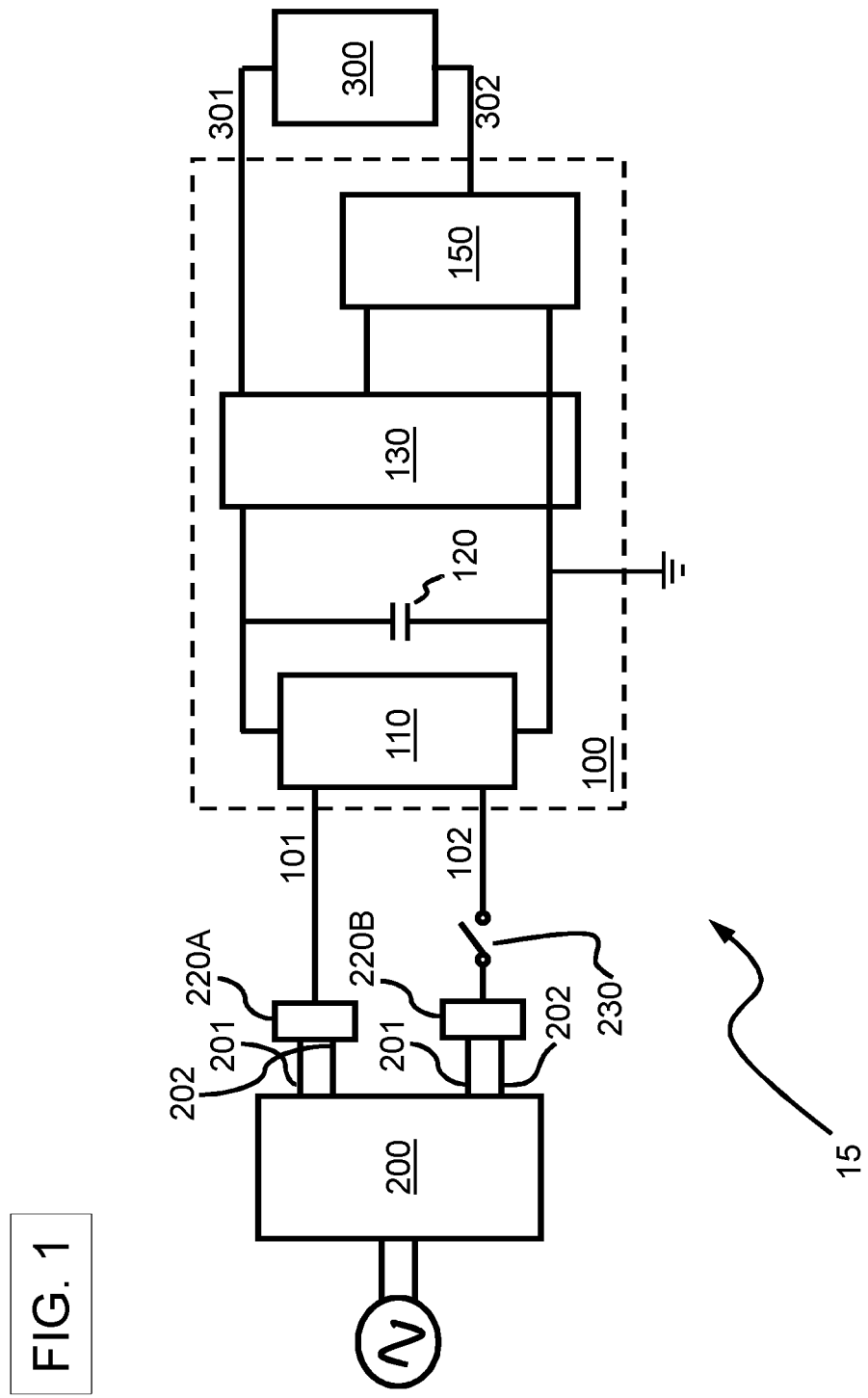
FIG. 1 is a schematic view of an exemplary embodiment of an electronic driver for a lighting module.

In the following, the exemplary embodiment of the driver and the lighting module will be explained in more detail with reference to the accompanying figures. The same or similar elements or elements having the same effect are indicated by the same reference numerals and repeated description thereof may be omitted in order to avoid redundancies. The figures and the size relationships of the elements illustrated in the figures among one another should not be regarded as to scale. Rather, individual elements may be illustrated with an exaggerated size to enable better illustration and/or better understanding.

In FIG. 1, an exemplary embodiment of a driver 100 for a lighting module 15 is shown. The driver 100 comprises voltage inputs 101, 102 for receiving a supply voltage from an ECG 200.

The ECG 200 is powered by a power supply such as a standard AC power supply operating at 230 v. However, it is also contemplated that the ECG could be designed for a DC power supply or an AC power supply operating at another voltage. The ECG produces pairs of outputs 201, 202. Each pair of outputs is wired to a respective filament 220A, 220B. The filament 220A produces a first driver input 101. The filament 220B is connected via a relay 230 to a second driver input 102. The relay 230 is provided as a safety mechanism and is controlled by separate relay circuitry (not shown). The relay circuitry senses when the ECG produces a voltage output, and in response, causes the relay 230 to switch to a closed or conducting state.

The driver inputs 101, 102 of the driver 100 are provided to a bridge 110, which is alternately referred to as a boost convertor. The bridge 110 is used to achieve ECG compatibility. The rectified voltage output by the bridge 110 is applied to an input filter capacitor 120 provided in parallel with a ringing choke converter (RCC) control 130. The driver 100 also comprises a feedback circuit 150 which is coupled to the RCC control 130. The feedback circuit 150 helps to ensure that a current provided by the driver 100 to light-emitting element 300 is relatively constant and controllable.

The RCC control 130 produces a first driver output 301 which powers the light-emitting element 300. A second driver output 302 connects the light-emitting element 300 back to the feedback circuit 150 of the driver 100.

Figure 2:
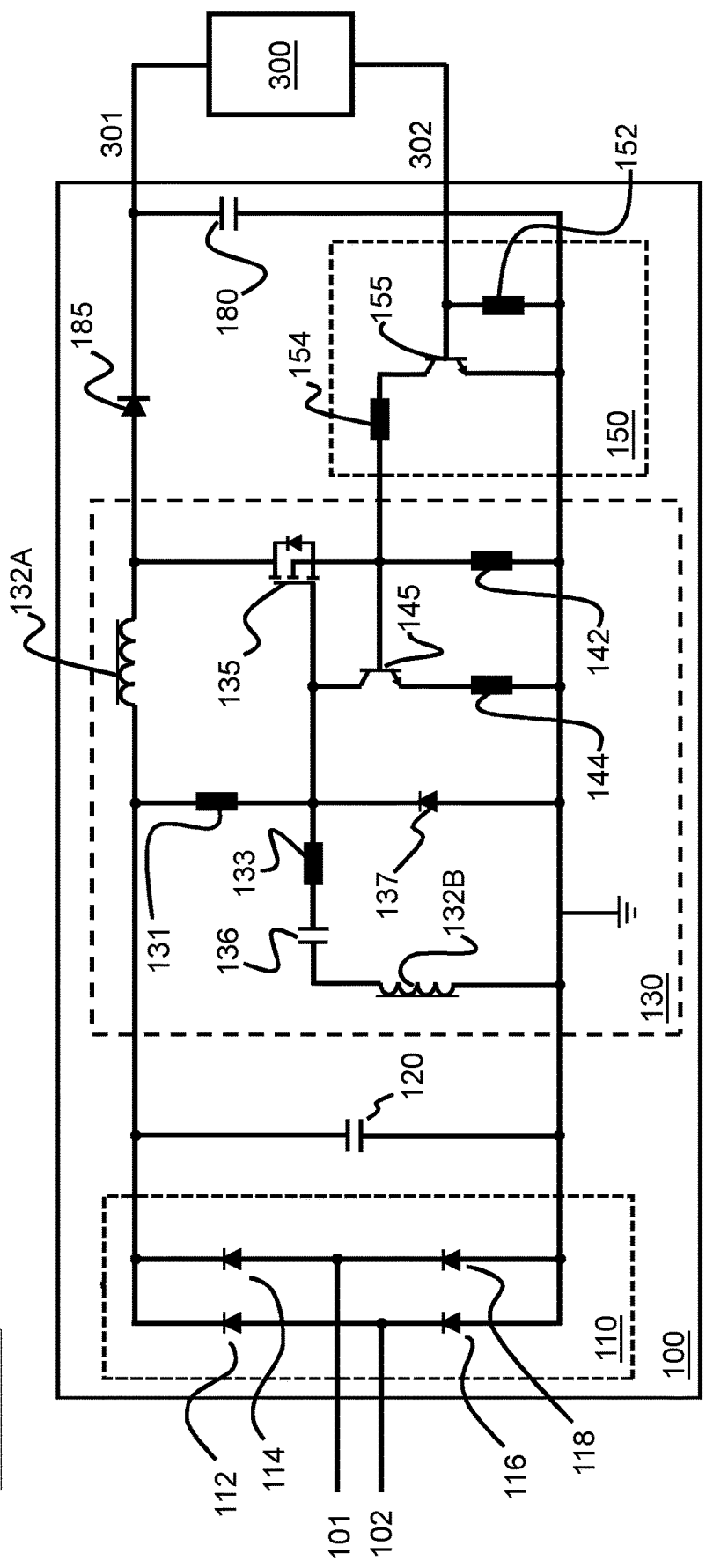
FIG. 2 is a schematic view of the exemplary embodiment of the electronic driver of FIG. 1, shown in more detail.

In FIG. 2, a schematic view of the driver 100 shown in FIG. 1 is illustrated in more detail.

As shown in FIG. 2, the bridge 110 comprises four diodes 112, 114, 116 and 118 for converting or rectifying the voltage provided from ECG 200 on driver inputs 101, 102. Specifically, the first driver input 101 is connected between diodes 118 and 114, whereas the second driver input 102 is connected between diodes 112 and 116. The rectified voltage output by diodes 112, 114 is applied in parallel to both the input filter capacitor 120 and the RCC control 130.

The RCC control 130 comprises a startup resistor 131 connected in series to a base current limiting resistor 133 and a frequency adjusting capacitor 136. These components are connected between the coils of the transformer 132, which comprises a primary coil 132A and an auxiliary coil 132B.

The RCC control 130 also comprises a power switching transistor 135, which in this embodiment is provided as a MOSFET; specifically an n-channel MOSFET. However, alternative designs may use other types of transistors to implement the power switching transistor 135. In any case, a gate of the power switching transistor 135 is connected between the startup resistor 131 and the base current limiting resistor 133.

When a rectified voltage from the bridge 110 is applied to the RCC control 130, the rectified voltage causes frequency adjusting capacitor 136 to charge via the startup resistor 131 and the base current limiting resistor 133. When the frequency adjusting capacitor 136 is sufficiently charged, the power switching transistor 135 begins conducting. At the same time, current building up on the primary coil 132A is transformed to current on the auxiliary coil 132B. A resulting voltage on auxiliary coil 132B flows through frequency adjusting capacitor 136 and resistor 133 to cause the voltage on the gate of power switching transistor 135 to stay high. In other words, these components of the RCC control 130 work together to provide positive feedback when the power switching transistor 135 starts to turn on, so as to quickly put the power switching transistor 135 into a fully conducting state.

When the power switching transistor 135 is on (i.e., in a conducting state), current travels via the transformer's primary coil 132A to a primary conduction limiting resistor 142. The primary conduction limiting resistor 142 is connected between a base of a conduction limiting transistor 145 and ground. In this embodiment, the conduction limiting transistor 145 is implemented as a Bipolar Junction Transistor (BJT) such as an NPN transistor. However, alternative designs may use other types of transistors to implement the conduction limiting transistor 145.

The conduction limiting transistor 145 has a collector wired to the gate of the power switching transistor 135 and an emitter that is connected via resistor 144 to ground. Therefore, when the voltage over the primary conduction limiting resistor 142 exceeds a threshold voltage of the conduction limiting transistor 145, the conduction limiting transistor begins conducting. This causes the voltage on the gate of power switching transistor 135 to drain via resistor 144 to ground, with the result that the power switching transistor 135 is turned off.

When the power switching transistor 135 turns off, the transformer's primary coil 132A discharges its stored energy.

This produces a current on the first driver output 301, which powers the light-emitting element 300. After the transformer's primary coil 132A has completely discharged, the power switching transistor 135 will turn on again, and the cycle repeats.

The driver 100 also includes feedback circuit 150, which comprises a feedback-control resistor 152 connected to the light-emitting element 300 via the second driver output 302. The feedback-control resistor 152 is connected between a base of a feedback transistor 155 and ground. In this embodiment, the feedback transistor 155 is implemented as a BJT such as an NPN transistor. However, alternative designs may use other types of transistors to implement the feedback transistor 145.

When current flowing through the light-emitting element 300 exceeds a predetermined amount, the resulting voltage over the feedback-control resistor 152 exceeds a threshold voltage of the base of the feedback transistor 155. This causes the feedback transistor 155 to switch to a conducting state. As a result, a secondary conduction limiting resistor 154 provided in the feedback circuit 150 is connected in parallel to the primary conduction limiting resistor 142 provided in the RCC control 130. The combined impedance of the conduction limiting resistors 142, 154 is therefore reduced, as compared to the situation in which only the primary conduction limiting resistor 142 is applied at the source of the power switching transistor 135. This, in turn, causes the conduction time of the power switching transistor 135 to increase. The increased conduction time results in a reduced system impedance, and a decrease in power provided to the light-emitting element 300. Therefore, the feedback circuit 150 has the effect of stabilizing the current provided to the light-emitting element 300.

The threshold voltage or switching voltage of BJT's is affected by operating temperature: the higher the operating temperature, the lower the switching voltage. The driver is adapted to operate within a range of environments, where the environmental temperature is between −20° C. and 50° C. An operating temperature of the driver can be affected by the environmental temperature. Furthermore, an increased operating temperature of the driver 100 could decrease the switching voltage of the conduction limiting transistor 145. This would lead to a decrease in the conduction time of the power switching transistor 135. And the decreased conduction time would cause the power supplied to light-emitting element 300 to increase.

However, feedback transistor 155 is also a BJT, and therefore its switching voltage is influenced by temperature in a manner similar to the conduction limiting transistor 145. Reducing the switching voltage of feedback transistor 155 leads to an increase in the conduction time of the power switching transistor 135. This limits or counteracts the effects of temperature-shifted switching voltage of the conduction limiting transistor 145.

The above discussion focuses on an increased operating temperature relative to a reference temperature. However, the same considerations apply in case the operating temperature of the driver 100 is decreased with respect to its normal operating temperature. In other words, for any change in temperature (positive or negative), the shifted threshold voltages for the conduction limiting transistor 145 and the feedback transistor 155 will counteract each other's effects. The result is a driver 100 that is able to deliver a more stable current to the light-emitting element 300, over a wider range of operating temperatures.

The driver 100 further comprises a filter capacitor 180, connected between a flywheel diode 185 and ground. The filter capacitor 180 and flywheel diode 185 help to stabilize the voltage provided to the light-emitting element. When the transformer 132 discharges, current flows through the flywheel diode 185 to filter capacitor 180 and light-emitting element 300. When the transformer stops discharging, the filter capacitor 180 powers the light-emitting element 300 while the fly-wheel diode 185 prevents charge from the filter capacitor 180 from flowing back toward the power switching transistor 135. In this way, the filter capacitor 180 works in conjunction with the transformer 132 and light-emitting element 300 to suppress high voltages produced by the ECG 200.

It will be obvious for a person skilled in the art that the illustrated embodiment only depicts one example of a plurality of possibilities. Hence, the embodiments discussed here should not be understood to form a limitation of these features and configurations. Any possible combination and configuration of the described features can be chosen according to the scope of the invention.

LIST OF REFERENCE NUMERALS

100 Driver for a lighting module
101, 102 First and second driver inputs
110 Bridge
112, 114,
116, 118 Diodes
120 Input filter capacitor
130 Ringing choke converter (RCC) control
131 Startup resistor
132A Transformer primary coil
132B Transformer auxiliary coil
133 Base current limiting resistor
135 Power switching transistor
136 Frequency adjusting capacitor
137 Diode
142 Primary conduction limiting resistor
144 Resistor
145 Conduction limiting transistor
150 Feedback circuit
152 Feedback-control resistor
154 Secondary conduction limiting resistor
155 Feedback transistor
180 Filter capacitor
185 Fly-wheel diode
200 Electronic control gear (ECG)
201, 202 ECG pairs of outputs
220A, 220B Filaments

230 Relay
300 Light-emitting element
301, 302 First and second driver outputs

The invention claimed is:

1. A driver for a lighting module, the driver comprising:
   a plurality of driver inputs configured to be connected to an electronic control gear and configured for receiving a supply voltage therefrom;
   a plurality of driver outputs with connectors configured for engaging a light-emitting element and providing power thereto;
   a ring choke converter control circuit comprising a power switching transistor and a transformer, wherein the ring choke converter control circuit is connected to the plurality of driver outputs, and wherein the power switching transistor is adapted to control power supplied to the transformer; and
   a feedback circuit coupled to the ring choke converter control circuit and at least one of the driver outputs, wherein the feedback circuit is adapted to stabilize the power provided to the light-emitting element;
   characterized in that a current through the plurality of driver outputs which exceeds a threshold causes the feedback circuit to reduce an impedance applied to the ring choke converter control circuit, which in turn reduces a conduction time of the power switching transistor;
   wherein:
   the ring choke converter control circuit further comprises a conduction limiting transistor coupled to the power switching transistor;
   the feedback circuit further comprises a feedback transistor coupled to a base of the conduction limiting transistor; and
   the current through the plurality of driver outputs which exceeds the threshold causes the feedback transistor to reduce the impedance applied to the base of the conduction limiting transistor, which in turn reduces the conduction time of the power switching transistor.

2. The driver according to claim 1, wherein the feedback circuit is further adapted to prevent an increase in the power supplied to at least one of the driver outputs when the power supplied by the power switching transistor to the transformer increases when the driver is operated at an increased operating temperature.

3. The driver according to claim 1, wherein the current delivered to the driver outputs is measured as a voltage over a feedback-control resistor and applied to a base of the feedback transistor.

4. The driver according to claim 3, wherein the feedback-control resistor is provided in the feedback circuit.

5. The driver according to claim 1, wherein at least one of the conduction limiting transistor and the feedback transistor is implemented as a bipolar junction transistor.

6. The driver according to claim 5, wherein the transistors used to implement the conduction limiting transistor and the feedback transistor have the same polarity.

7. The driver according to claim 1, wherein the power switching transistor is implemented as a MOSFET.

8. The driver according to claim 1, further comprising a bridge configured for receiving the supply voltage from the driver inputs and supplying rectified power to the ring choke converter control circuit.

9. A lighting module comprising:
   the driver according to claim 1; and
   the light-emitting element, wherein the light-emitting element is coupled to the plurality of driver outputs of the driver.

10. The lighting module according to claim 9, wherein the light-emitting element is a light emitting diode (LED).

11. A lamp comprising the lighting module according to claim 9.

* * * * *